United States Patent [19]

Wakeman et al.

[11] 4,162,127
[45] Jul. 24, 1979

[54] DASHER ASSEMBLY

[75] Inventors: Alden H. Wakeman, Lake Mills; Leonard R. Heiliger, Fort Atkinson, both of Wis.

[73] Assignee: Crepaco, Inc., Lake Mills, Wis.

[21] Appl. No.: 864,631

[22] Filed: Dec. 27, 1977

[51] Int. Cl.$^2$ .............................................. A23G 9/16
[52] U.S. Cl. ...................................... 366/149; 62/343; 366/177; 366/295; 366/312
[58] Field of Search ............... 366/104, 145, 149, 177, 366/280, 295, 299, 307, 312, 329; 62/342, 343

[56] References Cited

U.S. PATENT DOCUMENTS

| 2,056,431 | 10/1936 | Light | 62/342 X |
| 2,559,032 | 7/1951 | Tacchella | 62/343 X |
| 2,867,994 | 1/1959 | Wakeman | 62/343 |

Primary Examiner—Philip R. Coe
Attorney, Agent, or Firm—Neuman, Williams, Anderson & Olson

[57] ABSTRACT

A dasher assembly is provided for use within the cylindrical freezer chamber of a continuous ice cream freezer or the like. The dasher assembly includes an elongated imperforate first section which coacts with a portion of the chamber interior surface to form an elongated annular narrow passage through which a product entering the chamber is caused to initially flow at a predetermined rate so that the product upon leaving the passage has attained a predetermined temperature and viscosity whereby air, or similar fluid, mixed with the product will not migrate through the chamber and cause the product dispensed from the chamber to have uneven overrun. Affixed to and extending longitudinally from the first section is an elongated skeletal second section. The first and second sections are power driven to rotate as a unit. Disposed within the second section is a beater assembly which causes the product upon leaving the narrow passage and passing through the remainder of the chamber to be subjected to a whipping action prior to being dispensed from the chamber.

6 Claims, 9 Drawing Figures

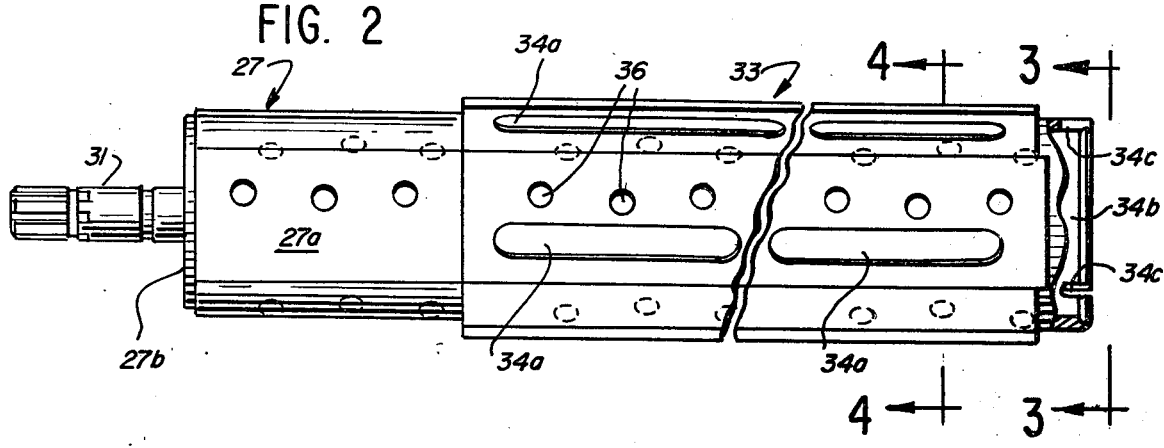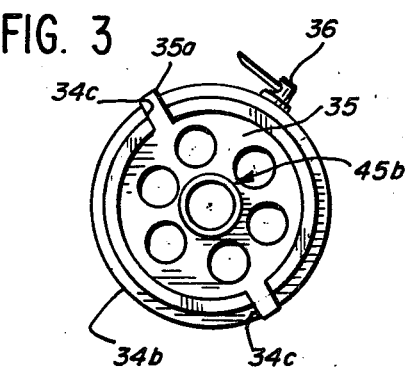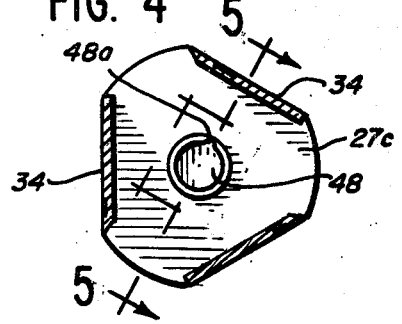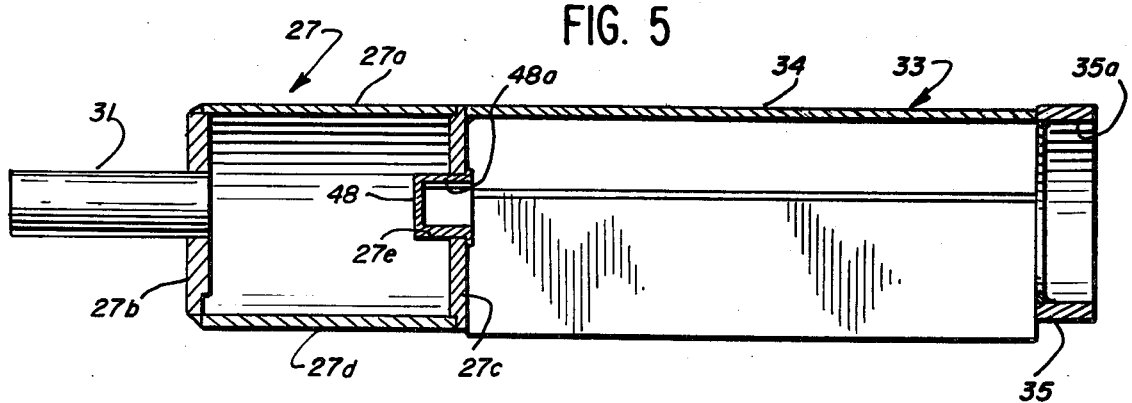

DASHER ASSEMBLY

BACKGROUND OF THE INVENTION

In the commercial production of ice cream and similar frozen confections the attainment of a uniform texture, a palatable character without protein distabilization, and controlled overrun in the final product are factors which seriously affect the marketability of and consumer appeal for the product and also contribute to the efficiency and economy of production. It has been found that if air or other fluid is introduced into the ice cream mix when the latter is at a predetermined temperature (e.g., 26°-27° F.), the viscosity of the mix is optimum for mixing therewith air or other fluid so as to produce a desired homogeneous product.

Various dasher assemblies have heretofore been provided; however, due to certain design features, they have in varying degrees experienced difficulty in obtaining the desired results as to the product being dispensed. In certain prior structures the mix and air, or other fluid, are subjected to a whipping action immediately upon the mix entering the freezer chamber and before it has reached the optimum temperature with the result that excessive whipping is done in an effort to effect the desired intermixing; however, in so doing protein distabilization oftentimes occurs and the desired homogeneous mixture of mix and air is not obtained. In other instances where whipping of the mix with air occurs before the mix has attained a predetermined temperature, the dispersion of the air is non-uniform resulting in varying overrun of the finished product, as well as unstable flow from the freezer.

SUMMARY OF THE INVENTION

Thus, it is an object of the invention to provide a dasher assembly which avoids the problems aforenoted.

It is a further object of the invention to provide a dasher assembly in which a selected amount of air, or a similar fluid, is caused to be combined with the ice cream mix only when the latter has attained a predetermined temperature and viscosity within the freezer chamber thereby preventing the air, or other fluid, from migrating through the dasher and producing uneven overrun in the dispensed ice cream.

It is a further object of the invention to provide a dasher assembly which is compact and may be readily cleaned when required.

Further and additional objects will appear from the description, accompanying drawings, and appended claims.

In accordance with one embodiment of the invention, a dasher assembly is provided for use in a cylindrical freezer chamber of a continuous ice cream freezer or the like. The dasher assembly is adapted to be power driven for rotation about the cylinder axis and includes a solid displacement first section which has one end thereof disposed adjacent the end of the chamber where the ice cream mix enters. The first section coacts with the interior surface of the chamber so as to form an elongated, annular, narrow passage through which the entering ice cream mix is caused to flow and attain a predetermined temperature. Affixed to and extending longitudinally from the opposite end of the first section is a skeletal second section. Disposed within the second section is a beater assembly which effects whipping of the ice cream mix while the latter moves from the passage to the opposite dispensing end of the chamber. The second section includes means for introducing a selected amount of air, or similar fluid, into the ice cream mix when the latter is at the predetermined temperature whereby the viscosity of the ice cream mix is such that the air, or similar fluid, will not migrate through the dasher assembly and cause the dispensed ice cream to have uneven overrun.

In the second embodiment of the invention, air may be introduced into the chamber prior to the mix passing through the narrow passage.

DESCRIPTION

For a more complete understanding of the invention reference should be made to the drawings wherein:

FIG. 2 is a side elevational view of the dasher assembly shown in FIG. 1 with the beater assembly and the scraper blades thereof having been removed.

FIG. 3 is a fragmentary right end elevational view of the assembly of FIG. 2 showing only one of a plurality of scraper blades mounted thereon.

FIG. 4 is a sectional view taken along line 4—4 of FIG. 2.

FIG. 5 is a fragmentary sectional view taken along line 5—5 pf FIG. 4.

Figure 1:
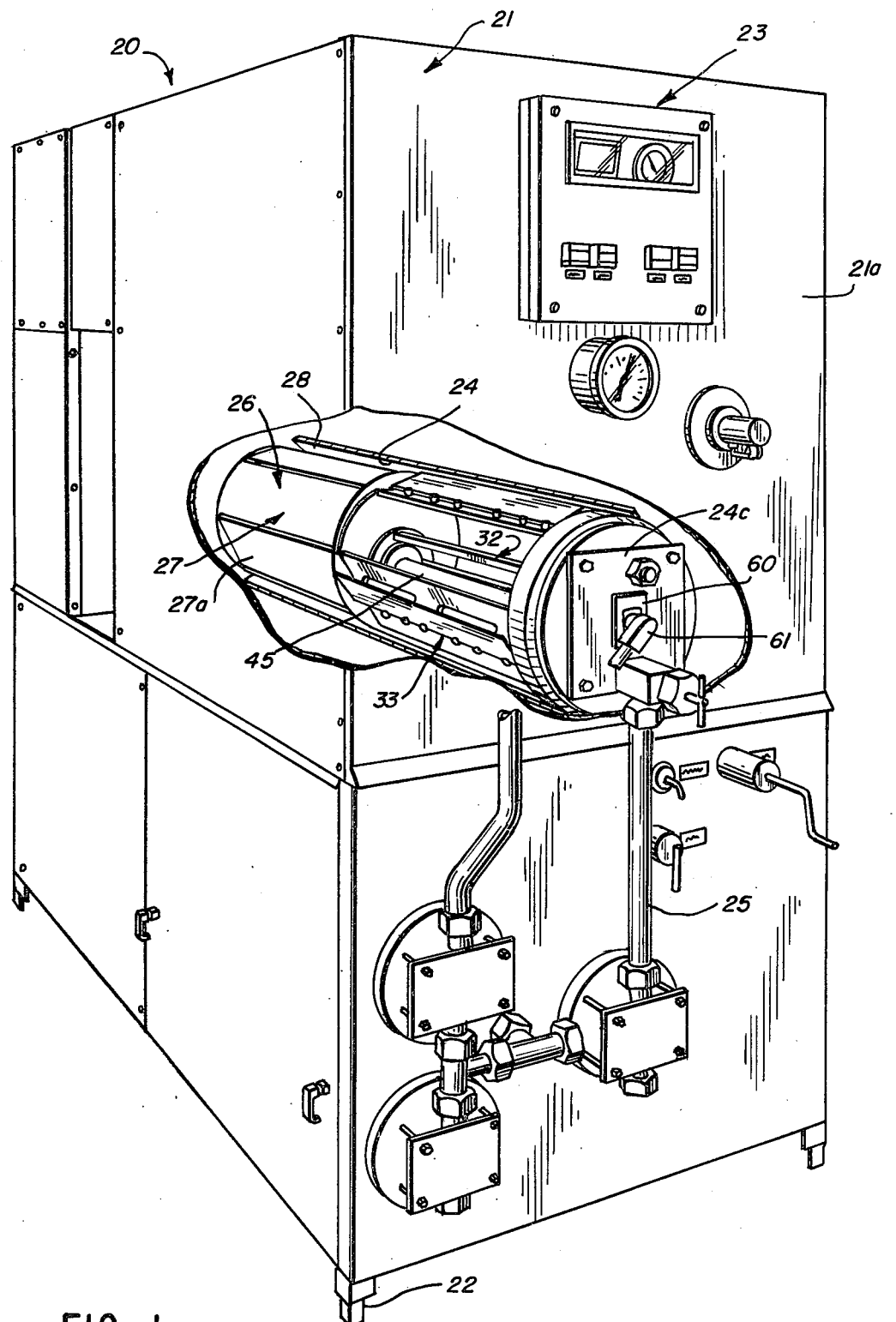
FIG. 1 is a fragmentary perspective view of a continuous ice cream freezer in which is mounted one form of the improved dasher assembly; a portion of the freezer housing being removed so as to expose a part of the freezer chamber interior and the improved dasher assembly disposed therein.

Referring now to the drawings and more particularly to FIG. 1, one form of a continuous ice cream freezer 20 is shown for use in commercial ice cream plants and/or dairies. The freezer 20 includes a housing 21 which is provided with a plurality of adjustable supporting legs 22. The front panel 21a of the housing is provided with various controls and gauges 23 for maintaining and indicating the desired pressures, flow rates and temperatures at various critical locations within the freezer.

Disposed within the upper portion of the housing 21 and extending rearwardly from the front panel 21a is a cylindrical freezer chamber 24 through which the ice cream mix flows and is intermixed with air, or other suitable fluid, and then dispensed through a discharged pipe 25 located on the exterior of the front panel 21a of the housing. The freezer chamber is mounted within a large cavity C in which is disposed liquid refrigerant R, see FIG. 8. As the refrigerant evaporates the resulting gas passes through an upwardly extending tank T which is concealed within the housing 21.

Figure 9:
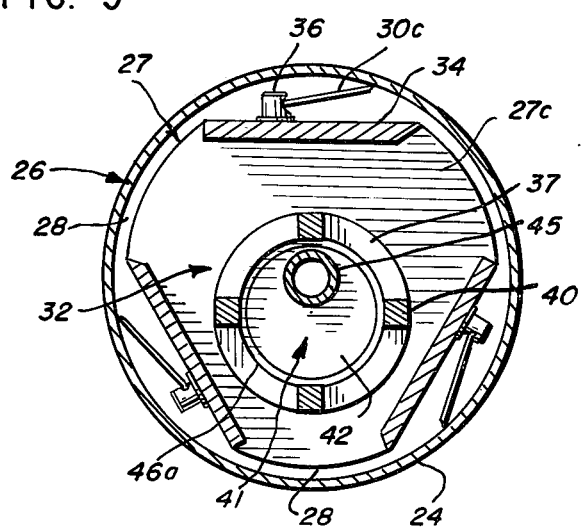
FIG. 9 is a sectional view taken along line 9° of FIG. 8.
Figure 8:
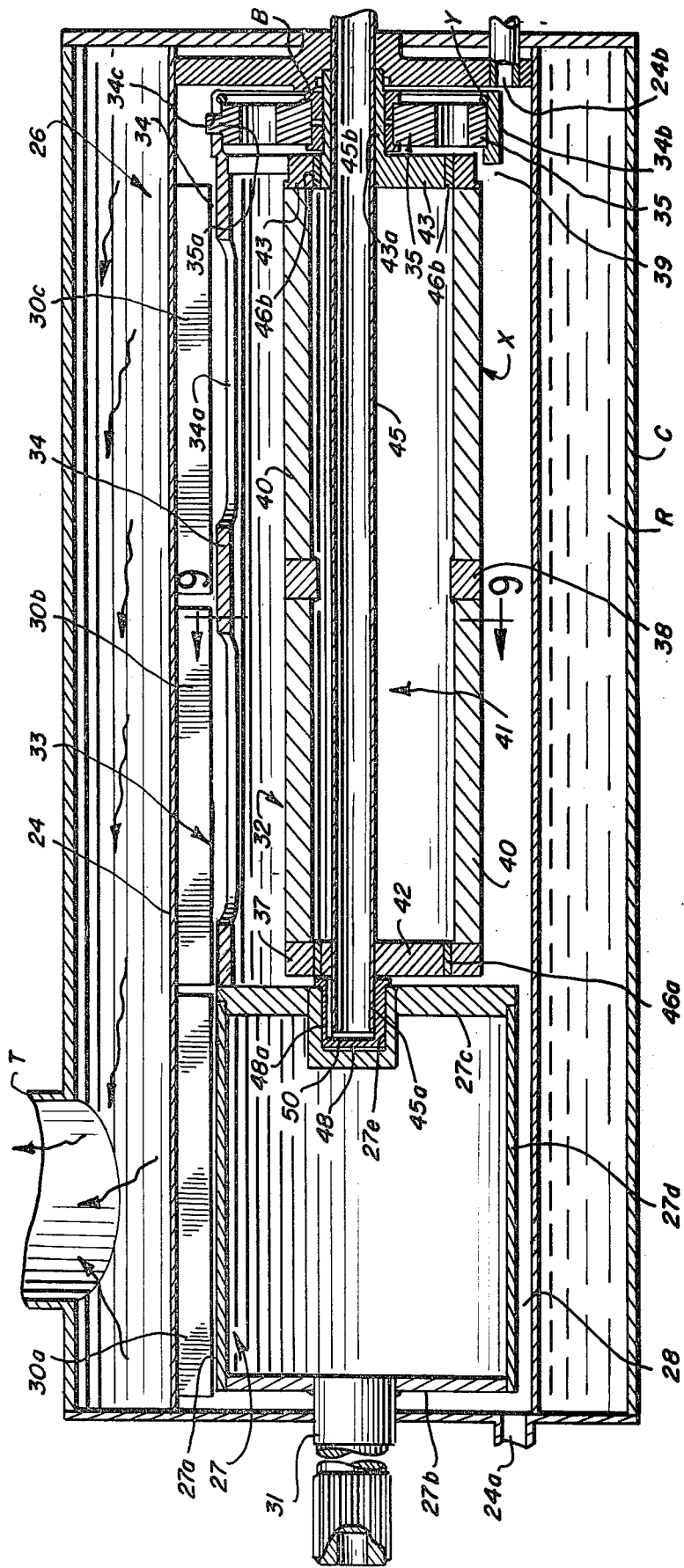
FIG. 8 is an enlarged fragmentary vertical sectional view of the dasher assembly shown in FIG. 1 with the various components thereof in assembled relation.

Located within the cylindrical freezer chamber 24 is an elongated dasher assembly 26 shown more clearly in FIGS. 8 and 9. The dasher assembly is driven so as to rotate about the central axis of the chamber in a manner well understood in the art. The dasher assembly 26 includes a drumlike, positive displacement first section 27 which is positioned adjacent the upstream, or rear, end of the chamber furthest removed from the housing front panel 21a. The cross-sectional configuration of section 27 is preferably such that it occupies approximately 80% of the cross-sectional area of chamber 24. It is at the rear end of the chamber that the product (ice cream mix) enters the chamber through a port 24a. The peripheral configuration of the first section 27 coacts with the interior surface of the chamber to form an elongated, narrow, annular passage 28 through which the entering product is initially caused to flow at a predetermined rate. It will be noted that the exterior of the first section 27 is provided with a plurality of symmetrically arranged lands or facets 27a on which are mounted angularly extending first scraper blades 30a, each having a tapered outer edge which engages the interior surface of the chamber, see FIG. 8. As the dasher assembly rotates, the blades 30a scrape off from the chamber surface any product which has frozen thereon and, thus, prevent closing or obstructing of the passage 28 by the frozen product. Various types of scraper blades and the manner of mounting same on the exterior of the drumlike section are known in the art. Protruding axially rearwardly from an imperforate rear end plate 27b of the section 27 is a splined drive shaft 31 which is supported in a suitable bearing, not shown, and is connected by well known means to a drive motor, not shown.

As seen in FIG. 8, an imperforate front end plate 27c is provided, which is spaced axially forwardly from plate 27b and is connected thereto by an imperforate tubular segment 27d. Segment 27d has the exterior thereof provided with the lands 27a. End plate 27c, as shown, is provided with an axially disposed bearing pocket 27e for supporting therein one end of a beater assembly 32 in a manner to be described more fully hereinafter. It will be noted in FIG. 8 that section 27 is preferably hollow thereby reducing the weight and cost of the dasher.

Affixed to the extending longitudinally from end plate 27c is an elongated skeletal section 33 which includes a plurality of symmetrically arranged elongated ribs 34 having corresponding rear ends thereof fixedly secured to the periphery of end plate 27c. The corresponding opposite, or front, ends of the ribs 34 are supported by and engage of the periphery of a perforate front plate 35, see FIG. 8. Each rib is of like configuration and is axially aligned with a land 27a of the drumlike section 27. The ribs are provided with a plurality of longitudinally spaced elongated slots 34a. Disposed to one side of the slots 34a are a plurality of longitudinally spaced posts 36 to which second and third scraper blades 30b and 30c are connected, see FIG. 9. The corresponding blades 30a, 30b, and 30c are in substantial longitudinal alignment and extend substantially the length of the dasher and prevent the buildup of frozen product on the interior surface of the chamber 24. The blades 30b, 30c also cause the scraped product to be diverted from the chamber interior surface towards the axial center of the skeletal section 33. The slots 34a formed in the ribs 34 facilitate movement of the flowing product past the ribs during rotation of the dasher assembly. The skeletal section 33 preferably occupies approximately 12% of the cross-sectional area of chamber 24.

The front end of each rib 34 is integral with a ring 34b which is provided with a plurality of spaced open-ended apertures 34c through which extend radial lugs 35a formed on the periphery of plate 35. Thus, plate 35, ribs 34, and ring 34b are in interlocking engagement and rotate as a unit about the center axis of chamber 24.

Disposed within skeletal section 33 and occupying approximately 3% of the cross-sectional area of chamber 24 is the beater assembly 32, sometimes referred to as an agitator. The beater assembly imparts a vigorous whipping action to the product as it flows from the narrow, annular passage 28 through the remainder of the freezer chamber 24 before being dispensed therefrom through discharge port 24b.

The beater assembly 32, in the illustrated embodiment, includes a plurality of longitudinally spaced, coaxially aligned rings 37, 38, 39 which are interconnected by a plurality of elongated, symmetrically arranged rods 40. The rings and rods form a cagelike structure X. In certain instances the center ring 38 may be omitted in which case the rods will have only ends thereof secured to rings 37, 39.

Disposed within the cagelike structure is a support unit 41 which is eccentrically mounted within the interior of the skeletal section 33, see FIG. 9. Unit 41 includes a pair of longitudinally spaced, axially aligned, disc-shaped bearing plates 42, 43 which are interconnected by a shaft 45 which in certain embodiments may be solid, as will hereinafter be discussed. The plates 42, 43 and the hollow shaft 45 from unit 41 which remains in a substantially stationary position during rotation of the dasher assembly about the central axis of chamber 24.

A ring bearing 46a is positioned between the periphery of plate 42 and ring 37, the latter forming a part of cagelike structure X. A similar bearing 46b is interposed ring 39 and the periphery of plate 42. The ring bearings, while supporting the cagelike structure, also permit the latter to freely rotate about plates 42, 43 as sections 27, 33 of the dasher assembly rotate as a unit. The rotation of the cagelike structure is produced by the reaction thereof to the movement of the product effected by the rotation of the sections 27, 33.

In the illustrated embodiment, see FIG. 8, one end 45a of the hollow shaft 45 is journaled in the pocket 27e formed in the end plate 27c of the drumlike section 27. A cup-shaped bearing 48 is fixedly positioned within pocket 27e and supportingly engages the open end 45a of hollow shaft 45 as the plate 27c rotates about the shaft 45 as an axis. The open end 45a is spaced from the end face of the bearing 48 and forms a cavity 50 which, in turn, communicates with a longitudinally extending groove 48a formed in the interior surface of bearing 48. The groove 48a terminates within the interior portion of the chamber 24 emcompassed by skeletal section 33 and adjacent the front surface of end plate 27c.

Cagelike structure X is retained in assembled relation on the exterior of support unit 41 by means of a bushing B which encompasses a hub 43a protruding forwardly from plate 43. The bushing B, in turn, is encompassed by perforated plate 35 which forms the outlet, or front, end of the dasher assembly 26. The end plate 35 is retained in place with respect to the ribs and ring 34b by a snap ring Y which fits within a groove formed in the ring 34b, see FIG. 8.

Figure 7:
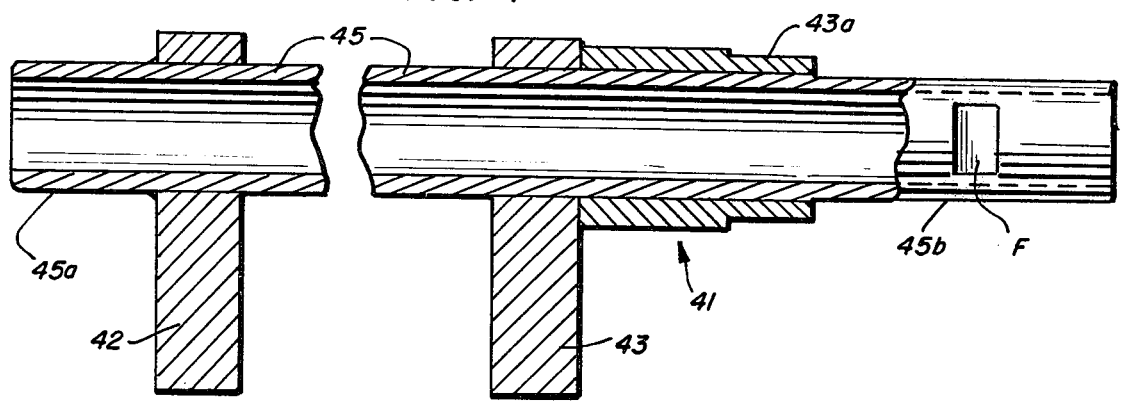
FIG. 7 is an enlarged fragmentary sectional view taken along line 7—7 of FIG. 6.
Figure 6:
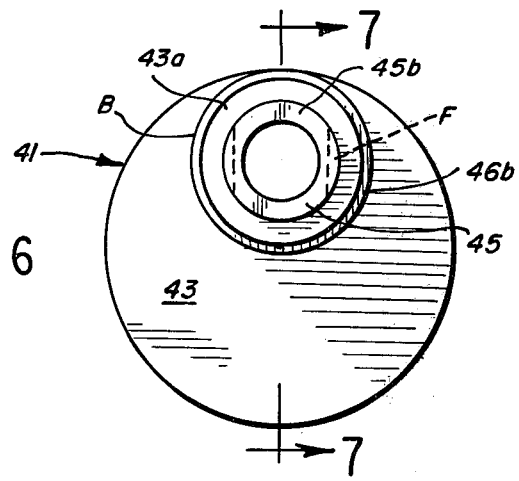
FIG. 6 is an enlarged end elevational view of an element of the beater assembly which, in turn, forms a component of the dasher assembly shown in FIG. 1.

The end 45b of shaft 45, see FIG. 7, protrudes through a door 24c formed at the front end of the chamber 24 and extending beyond the front wall 21a of the housing 21. The protruding end of the shaft is provided with diametrically opposed exterior flats, or facets, F which in turn receive a fork 60, see FIG. 1. The fork holds the shaft in a fixed position.

The end 45b of shaft 45 is connected to a suitable source of compressed sanitary air through the union 61, thereby enabling a controlled amount of air to be introduced into chamber 24. Suitable controls are provided for metering the desired volume of air to be combined with the ice cream mix, as the latter leaves the annular narrow passage 28.

While the sanitary air is shown being introduced into the freezer chamber 24 through union 61 and hollow shaft 45, the invention is not intended to be limited thereto. For example, all or part of the required air might be combined with the ice cream mix prior to the latter entering chamber 24 through port 24a. In any of the variations described, an important feature is retained, namely, the temperature (viscosity) of the ice cream mix reaches a predetermined amount (e.g., 26°-27° F.) before the mix is subjected to vigorous whipping action for a substantial period of time while passing through skeletal section 33. At the predetermined temperature the viscosity of the mix is such that migration of air through the mix will not occur and optimum mixing and uniform dispersion of the air throughout the dispensed product (ice cream) will result.

Heretofore in prior dasher assemblies the mix was subjected to vigorous whipping action before it had attained a desired temperature wherein optimum mixing of air therewith occurred.

With the instant dasher assembly, the mix per se, or the air-mix combination, at a temperature of approximately 40° F. enters the freezer chamber through port 24a and is forced to flow through the narrow annular passage 28 at a relatively rapid rate while gaining viscosity due to freezing out of water in the mix. While flowing through the passage 28, the mix, or air-mix product, is subjected to maximum refrigeration with the scraper blades continually scraping frozen product from the chamber interior surface. Upon the flowing product having reached end plate 27c, the temperature of the product will have reached a predetermined amount (e.g., 26°-27° F.). The relative length of passage 28 should be approximately a minimum of 25% of the length of chamber 24. The desired temperature of the product can be attained by regulating the pressure within the chamber and hence the rate of vaporization of the refrigerant R surrounding, or substantially surrounding, the exterior of the chamber 24. The system and arrangement of various valves, meters, solenoids, pressure regulators, pressure controllers, pumps, etc. for attaining and maintaining the desired temperature of the mix, or air-mix product, at given locations within the chamber are not deemed to form an essential part of the disclosed invention and, therefore, will not be described in any detail.

Thus, it will be seen that an improved dasher assembly has been provided which is of simple construction; is capable of being removed from the freezer chamber and being readily disassembled for cleaning when required; and will enable the mix, or air-mix product, to flow through a predetermined section of the freezer chamber at a relatively rapid rate as compared to the remainder of the chamber 24, and at the same time being subjected to only minimal agitation whereby the temperature of the mix will reach a predetermined amount before the mix is subjected to a vigorous whipping action for a substantial period of time while passing through the remainder of the chamber. Thus, by reason of the foregoing action to which the air-mix product is subjected, optimum overrun control in the dispensed product is obtained. The size and shape of various components aforedescribed may be varied from that shown without departing from the scope of the disclosed invention.

We claim:

1. A freezing apparatus for ice cream mix or the like comprising an elongated cylindrical freezer chamber having a refrigerated interior surface, a first inlet for a first product ingredient adjacent one end of the chamber, a second inlet for a second product ingredient spaced from said first inlet, and a product outlet adjacent the opposite end of the chamber; and a power driven dasher assembly mounted within said chamber for rotation about a central longitudinal axis of said chamber; said assembly including a substantially cylindrical imperforate first section having one end thereof disposed adjacent said first inlet, the exterior of said first section coacting with the refrigerated interior surface of said chamber to form an elongated, relatively narrow annular passage through which the first product ingredient from the first inlet flows at a selected rate and is in contact with the refrigerated interior surface of the chamber and is cooled thereby to a predetermined temperature whereby the first product ingredient is at an optimum viscosity for being subjected to a vigorous whipping action; an elongated skeletal second affixed to and extending longitudinally from said first section and terminating adjacent the product outlet end of said chamber, said second section occupying substantially the remainder of said chamber through which the first product ingredient flows while at said predetermined temperature, said first and second sections rotating as a unit about said chamber central axis; first means carried by and movable with said first and second sections and in scraping contact with the refrigerated interior surface and removing therefrom any frozen product ingredient; and an elongated second means mounted within said skeletal second section of rotation independently thereof about a second axis offset with respect to the chamber axis, said second means being provided with an elongated hollow shaft having one end thereof supported by an end of said first section from which said skeletal second section extends, said hollow shaft being in communication with the chamber second inlet, said hollow shaft one end coacting with the supporting end of said first section to form an inlet for introducing the second product ingredient within the skeletal second section; said rotating second means imparting vigorous whipping action to and intermixing both product ingredients as they flow through the portion of the chamber occupied by the second section and effecting controlled overrun of the product dispensed from the chamber outlet.

2. The dasher assembly of claim 1 wherein the secnd section has a longitudinal dimension approximately three times greater than that of said first section.

3. The freezing apparatus of claim 1 wherein the hollow shaft of said second elongated means is stationary and includes a plurality of longitudinally spaced bearing elements mounted eccentrically on said shaft, the eccentricity of said elements defining said second axis, and an elongated cagelike unit mounted in encompassing relation on the exterior of said bearing elements for rotation independently thereof about said second axis.

4. The freezing apparatus of claim 3 wherein the one end of said shaft is journaled in a pocket formed in the end of said first section from which said second section extends, said pocket and the journaled end of said hollow shaft coacting to form a second passage for the second product ingredient, said second passage interconnecting the interior of said hollow shaft with the portion of the chamber in which the skeletal second section is disposed.

5. The freezing apparatus of claim 1 wherein the dasher assembly first section occupies about 80% of the cross-sectional area of said chamber, and the dasher assembly skeletal second section occupies about 12% of the cross-sectional area of said chamber, each cross-sectional area being defined by a cutting plane disposed transversely of the chamber axis.

6. The freezing apparatus of claim 5 wherein the second elongated means disposed within the dasher assembly second section occupies about 3% of the said cross-sectional area of said chamber.

* * * * *

UNITED STATES PATENT AND TRADEMARK OFFICE
CERTIFICATE OF CORRECTION

PATENT NO. : 4,162,127
DATED : July 24, 1979
INVENTOR(S) : ALDEN H. WAKEMAN and LEONARD R. HEILIGER It is certified that error appears in the above-identified patent and that said Letters Patent are hereby corrected as shown below:

Column 2, line 30 - "pf" should be --of-- line 35 - "FIG. 8" should start a new paragraph line 56 - after "chamber" insert --24--

Column 3, line 45 - delete "of" (first occurrence)

Column 4, line 26 - "from" should be --form-- line 51 - "emcompassed" should be --encompassed--

Column 5, line 46 - "refigerant" should be --refrigerant--

Column 6, line 27 (Claim 1) - after "second" insert --section-- line 39 (Claim 1) - "of" should be --for-- line 55 (Claim 2) - "secnd" should be --second--

Signed and Sealed this

Thirtieth Day of October 1979

[SEAL]

Attest:

RUTH C. MASON
Attesting Officer

LUTRELLE F. PARKER
Acting Commissioner of Patents and Trademarks